(12) United States Patent
Imagawa et al.

(10) Patent No.: US 12,429,117 B2
(45) Date of Patent: Sep. 30, 2025

(54) TOOTHED CABLE AND TOOTHED CABLE GUIDING APPARATUS

(71) Applicant: HI-LEX CORPORATION, Hyogo (JP)

(72) Inventors: Takuma Imagawa, Hyogo (JP); Shuhei Mieda, Hyogo (JP); Atsushi Nishimura, Hyogo (JP)

(73) Assignee: HI-LEX CORPORATION, Hyogo (JP)

( * ) Notice: Subject to any disclaimer, the term of this patent is extended or adjusted under 35 U.S.C. 154(b) by 31 days.

(21) Appl. No.: 18/269,173

(22) PCT Filed: Dec. 23, 2021

(86) PCT No.: PCT/JP2021/047763
§ 371 (c)(1),
(2) Date: Jun. 22, 2023

(87) PCT Pub. No.: WO2022/138789
PCT Pub. Date: Jun. 30, 2022

(65) Prior Publication Data
US 2024/0060550 A1    Feb. 22, 2024

(30) Foreign Application Priority Data

Dec. 23, 2020    (JP) .................................. 2020-214212

(51) Int. Cl.
*F16H 19/06*        (2006.01)
*B60J 7/043*        (2006.01)
(Continued)

(52) U.S. Cl.
CPC .......... *F16H 19/0622* (2013.01); *B60J 7/043* (2013.01); *F16C 1/20* (2013.01); *F16C 1/26* (2013.01)

(58) Field of Classification Search
CPC ......... F16H 19/0645; F16C 1/26; B60J 7/043; B60J 7/022
See application file for complete search history.

(56) References Cited

U.S. PATENT DOCUMENTS

| 2011/0187159 | A1* | 8/2011 | Katayama | ................ B60J 7/022 |
| | | | | 296/214 |
| 2017/0314656 | A1 | 11/2017 | Hoelzel et al. | |
| 2019/0024701 | A1* | 1/2019 | Scherle | .................. B60J 7/0573 |

FOREIGN PATENT DOCUMENTS

| JP | S58182831 U | 12/1983 |
| JP | H08207590 A | 8/1996 |

OTHER PUBLICATIONS

International Search Report from corresponding PCT Application No. PCT/JP2021/047763, Feb. 22, 2022.

* cited by examiner

*Primary Examiner* — Minnah L Seoh
*Assistant Examiner* — Gregory T Prather
(74) *Attorney, Agent, or Firm* — Workman Nydegger

(57) ABSTRACT

A toothed cable includes a cable body, and a cap provided at a tip of the cable body. The cap includes a conical tip portion, and a cylindrical body portion provided on a side of a base end of the tip portion, when the toothed cable moves in a direction from a side of the cap toward a side of the cable body in a curved guiding path of a guide member, the cap moves so as to be in sliding contact with an outer wall portion, and the toothed cable is configured such that an end region of the cable body, which end region is on the side of the cap, contacts an inner wall portion of the guide member when the cap comes into sliding contact with an edge of a concave portion of the guide member to limit an angle θ at which the cap swings.

4 Claims, 22 Drawing Sheets

(51) Int. Cl.
*F16C 1/20* (2006.01)
*F16C 1/26* (2006.01)

TOOTHED CABLE AND TOOTHED CABLE GUIDING APPARATUS

TECHNICAL FIELD

The present invention relates to a toothed cable and a toothed cable guiding apparatus.

BACKGROUND ART

Conventionally, to operate an operation target, such as a sunroof of a vehicle, and the like, for example, a drive cable to transmit the driving force of a drive source to the operation target is used (see Patent document 1, for example). The drive cable includes a toothed cable having teeth to mesh with gears of the drive source. A cap is provided at the tip of the toothed cable. This cap comprises a conical tip portion, and a cylindrical body portion provided to the base end side of this tip portion. For manufacturing reasons, a guide member to guide the toothed cable may have a concave portion on a surface opposing the toothed cable.

PRIOR ART DOCUMENT

Patent Document

Patent Document 1: JP H08-207590 A

SUMMARY OF THE INVENTION

Problem to be Solved by the Invention

However, there is a problem that, when the cap passes near a concave portion of the guide member in conjunction with a movement of the toothed cable, the cap collides with the guide member, causing a tapping sound to be generated.

An object of the present invention is to provide a toothed cable that makes it possible to suppress generation of a tapping sound caused by colliding of a cap provided to the tip of the toothed cable with a guide member when the cap is guided by the guide member to move.

Means to Solve the Problem

A toothed cable of the present invention is a toothed cable to move and be guided between an inner wall portion and an outer wall portion of a guide member by a driving force of a drive source and to transmit the driving force to an operation target, the guide member having the inner wall portion and the outer wall portion, the inner wall portion and the outer wall portion constituting a curved guiding path having a curvature to guide the toothed cable, the inner wall portion being provided on the inner side of the curvature in a diameter direction of the curvature and the outer wall portion being provided on the outer side of the curvature in the diameter direction of the curvature, the guide member having a concave portion on a surface of the outer wall portion, which surface opposes the toothed cable, wherein the toothed cable comprises a cable body, and a cap provided at a tip of the cable body, the cap comprises a substantially conical tip portion, and a substantially cylindrical body portion provided on a side of a base end of the tip portion, when the toothed cable moves in a direction from a side of the cap toward a side of the cable body in the curved guiding path of the guide member, the cap moves so as to be in sliding contact with the outer wall portion, and, the toothed cable is configured such that an end region of the cable body, which end region is on the side of the cap, contacts the inner wall portion of the guide member when the cap comes into sliding contact with an edge of the concave portion to limit an angle at which the cap swings in an orientation in which a tip of the cap approaches the outer wall portion.

Effects of the Invention

The present invention makes it possible to suppress generation of a tapping sound caused by colliding of a cap provided to the tip of the toothed cable with a guide member when the cap is guided by the guide member to move.

EMBODIMENT FOR CARRYING OUT THE INVENTION

Below, with reference to the drawings, a toothed cable and a toothed cable guiding apparatus of one embodiment of the present invention are described. Besides, the embodiment shown below is merely one example, so that the toothed cable and the toothed cable guiding apparatus of the present invention are not to be limited to the embodiment below.

Figure 1:
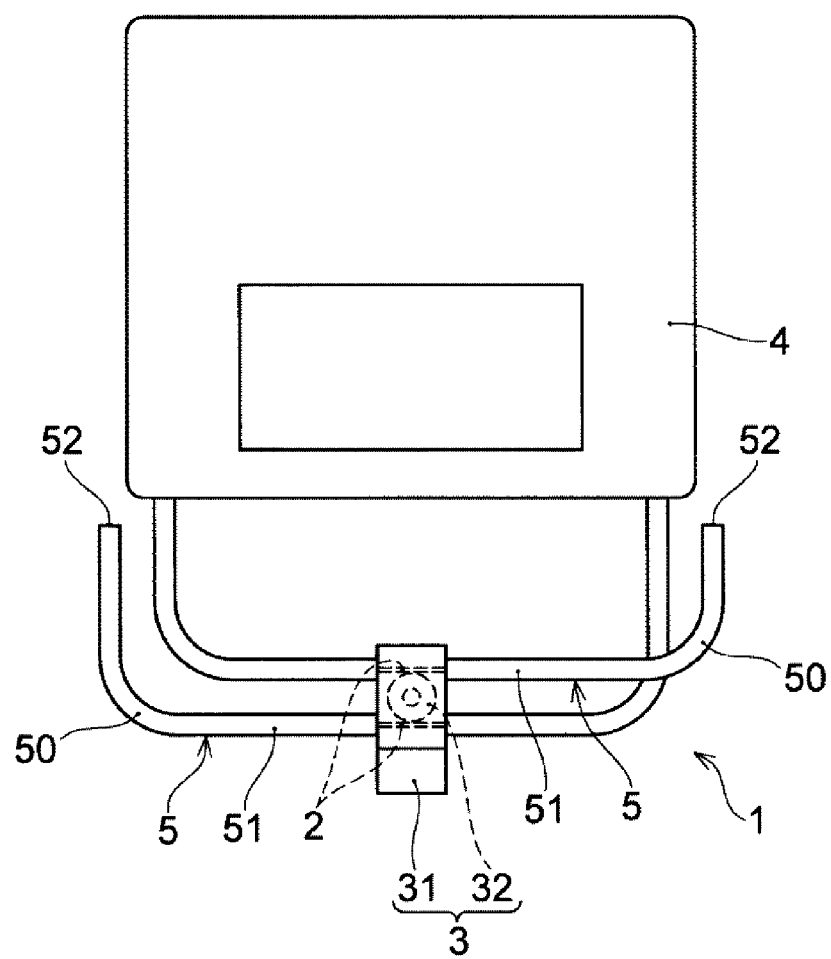
FIG. 1 is a view schematically showing one example of a toothed cable guiding apparatus of one embodiment of the present invention.
Figure 2:
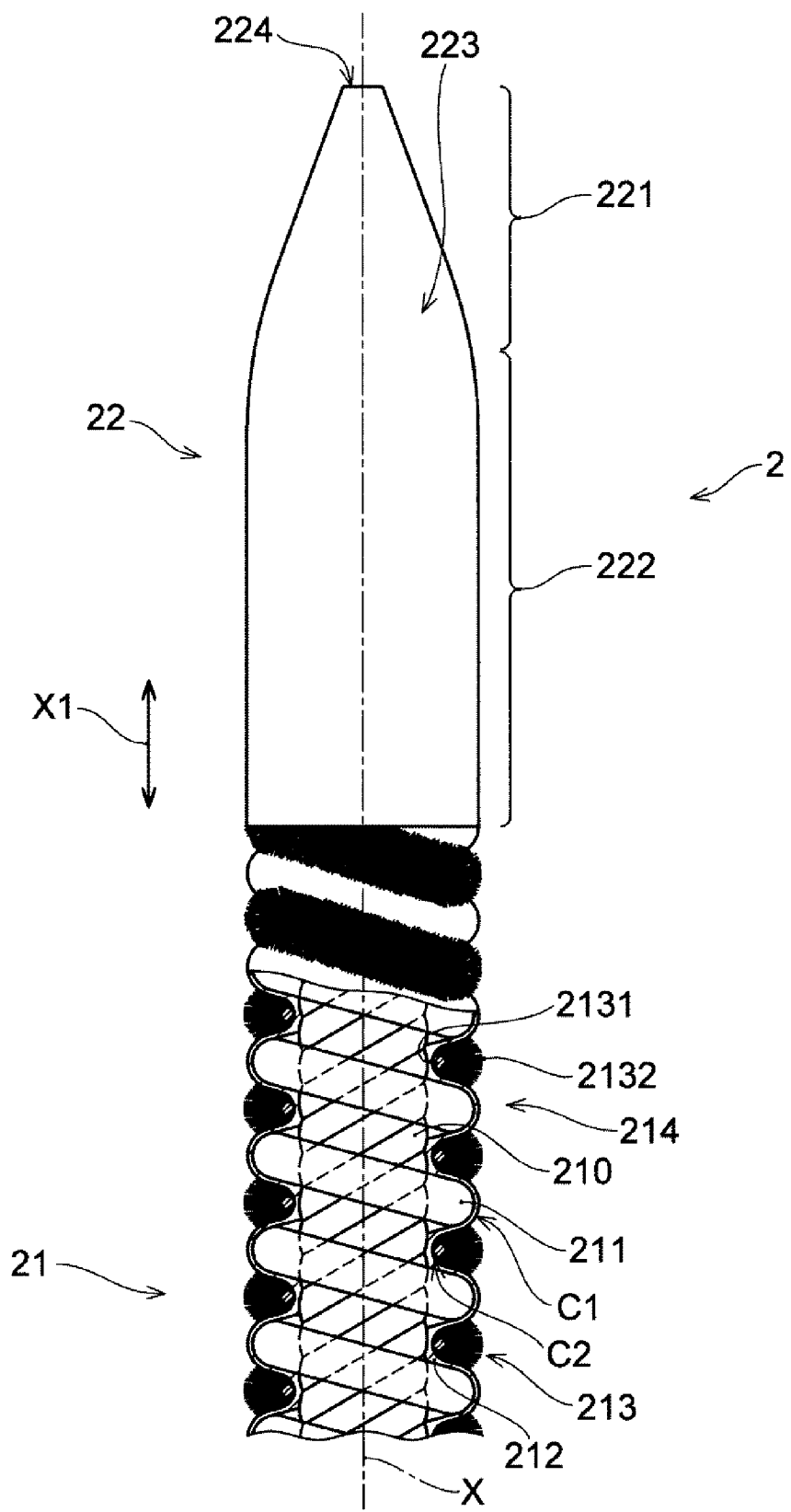
FIG. 2 is a view showing a toothed cable (a first example) of one embodiment of the present invention.
Figure 3:
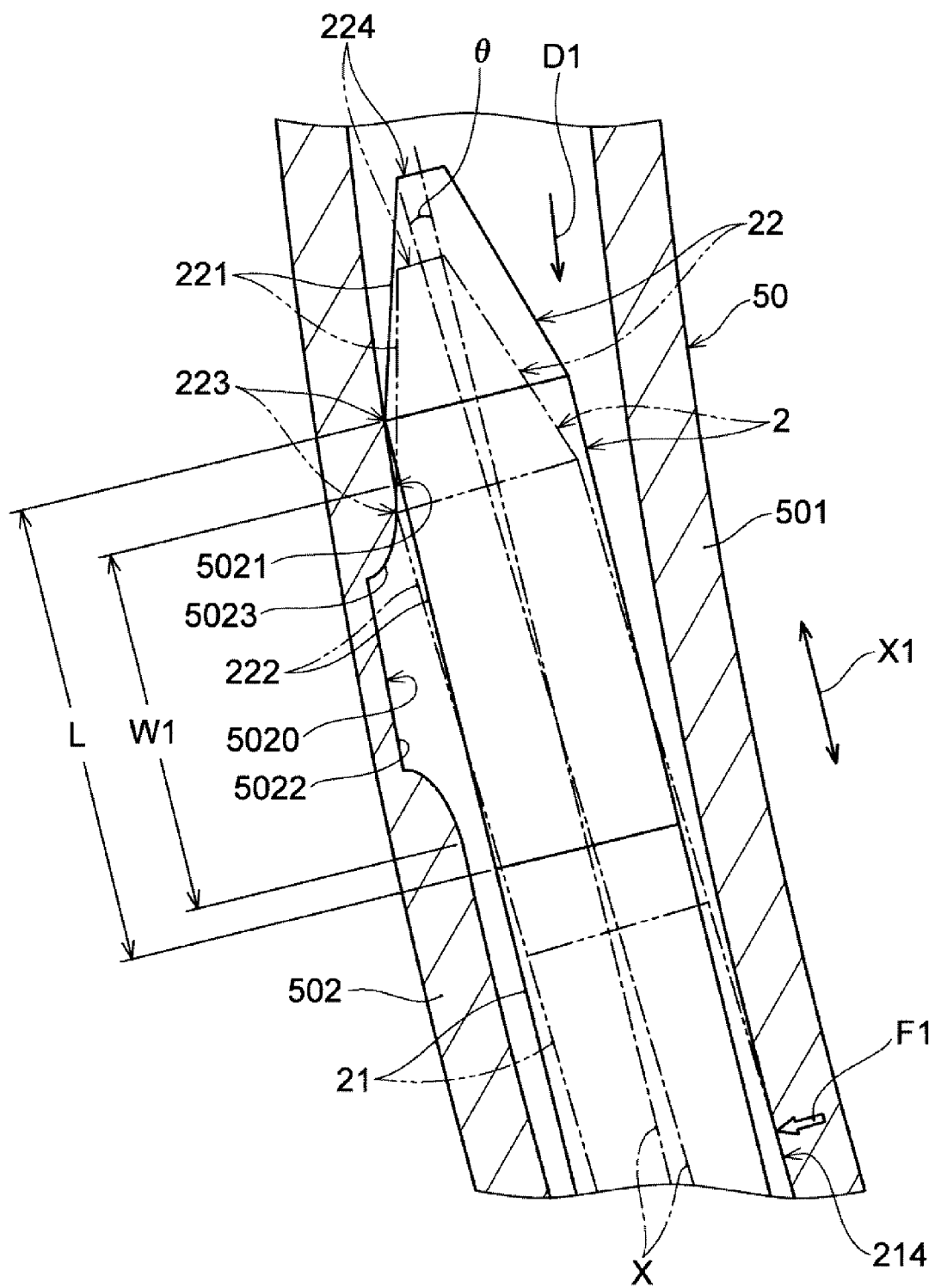
FIG. 3 is a view schematically showing one example of the behavior when the toothed cable (the first example) passes near a concave portion of a guide member.
Figure 4A:
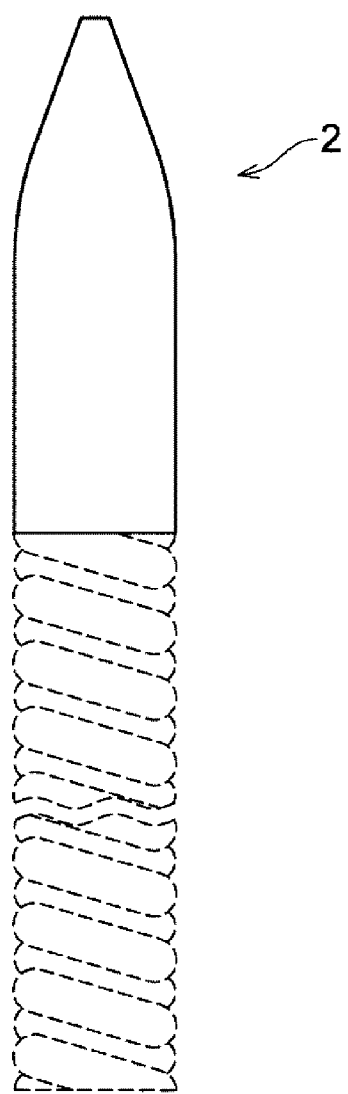
FIG. 4A is a front view showing, in a solid line, a characterizing portion of the toothed cable (the first example) of one embodiment of the present invention.
Figure 4B:
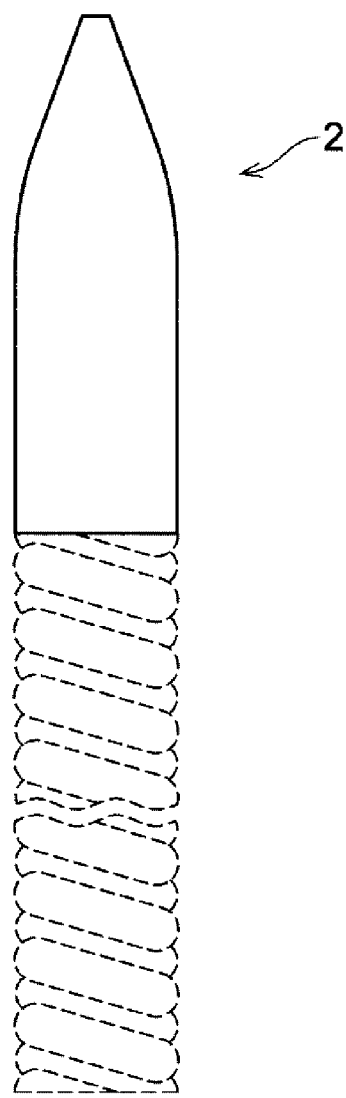
FIG. 4B is a rear view showing, in a solid line, a characterizing portion of the toothed cable (the first example) of one embodiment of the present invention.
Figure 4C:
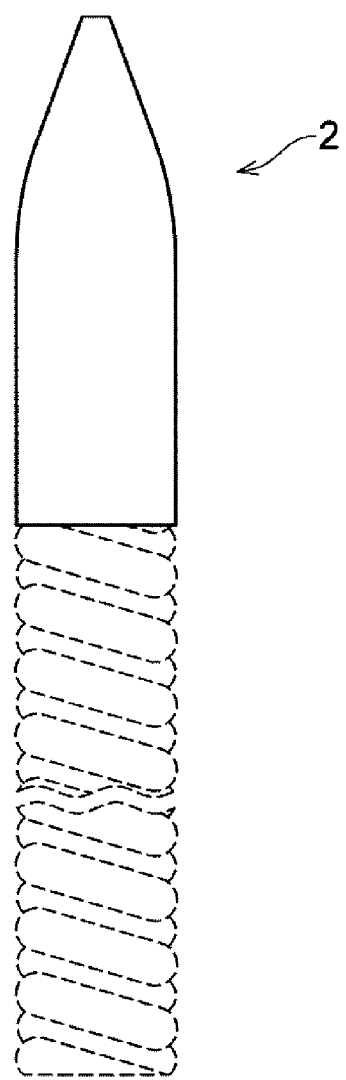
FIG. 4C is a right side view showing, in a solid line, a characterizing portion of the toothed cable (the first example) of one embodiment of the present invention.
Figure 4D:
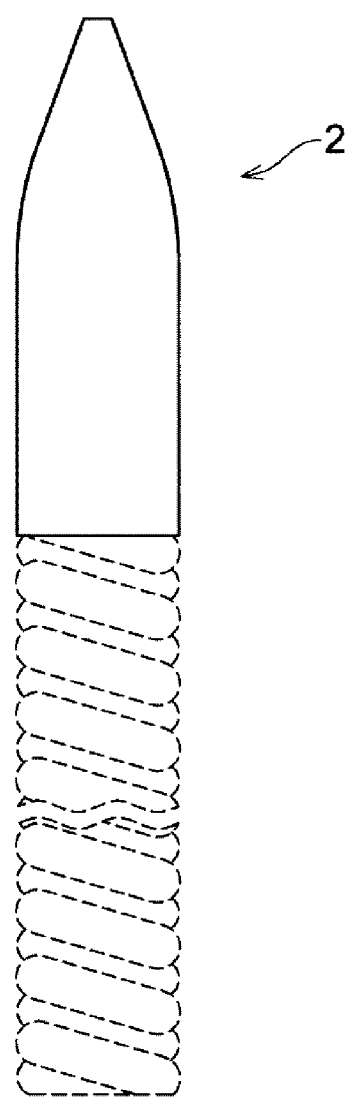
FIG. 4D is a left side view showing, in a solid line, a characterizing portion of the toothed cable (the first example) of one embodiment of the present invention.
Figure 4E:
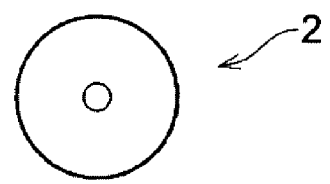
FIG. 4E is a plan view showing, in a solid line, a characterizing portion of the toothed cable (the first example) of one embodiment of the present invention.
Figure 4F:
FIG. 4F is a bottom view showing, in a solid line, a characterizing portion of the toothed cable (the first example) of one embodiment of the present invention.

FIG. 1 is a view schematically showing one example of a toothed cable guiding apparatus of one embodiment of the present invention. FIG. 2 is a view showing a toothed cable (a first example) of one embodiment of the present invention. FIG. 3 is a view schematically showing one example of the behavior when the toothed cable (the first example) passes near a concave portion of a guide member. Besides, FIG. 3 is shown with the guide member being cut along a length direction and also shows, in solid and chain double-dashed lines, how the toothed cable moves inside the guide member. FIG. 4A is a front view showing, in a solid line, a characterizing portion of the toothed cable (the first example) of one embodiment of the present invention. FIG. 4B is a rear view showing, in a solid line, a characterizing portion of the toothed cable (the first example) of one embodiment of the present invention. FIG. 4C is a right side view showing, in a solid line, a characterizing portion of the toothed cable (the first example) of one embodiment of the present invention. FIG. 4D is a left side view showing, in a solid line, a characterizing portion of the toothed cable (the first example) of one embodiment of the present invention. FIG. 4E is a plan view showing, in a solid line, a characterizing portion of the toothed cable (the first example) of one embodiment of the present invention. FIG. 4F is a bottom view showing, in a solid line, a characterizing portion of the toothed cable (the first example) of one embodiment of the present invention.

As shown in FIG. 1, a toothed cable guiding apparatus 1 comprises a guide member 5 having a curved guiding path, and a toothed cable 2 to be guided by the guide member 5 (see FIGS. 2 and 3).

The toothed cable guiding apparatus 1 according to the present embodiment shown in FIG. 1 has a configuration in which the toothed cable guiding apparatus 1 moves the toothed cable 2 shown in FIGS. 2 and 3 with the driving force of a drive source 3 and the above-mentioned driving force is transmitted to an operation target 4 via the toothed cable 2. The toothed cable 2 is guided by the guide member 5 when the toothed cable 2 moves by receiving the driving force of the drive source 3.

The guide member 5 guides the toothed cable 2 along a predetermined routing path. As shown in FIG. 3, the toothed cable 2 is slidably housed inside the guide member 5. In the present embodiment, the guide member 5 is a substantially U-shaped guide groove having an inner width greater than the outer diameter of the toothed cable 2 in a cross section being perpendicular to an axis X (a central axis line X of the toothed cable 2) in a length direction X1 (see FIG. 2) of the toothed cable 2. In other words, the guide member 5 has a configuration covering a part of the toothed cable 2 in the circumferential direction. The guide member 5 has a substantially U-shaped cross section in a direction perpendicular to the length direction by having an opening (not shown) extending over the entire length direction. Besides, FIG. 3 shows a cross section of the guide member 5 along the length direction as viewed from the side of the opening of the guide member 5. The width of the opening is preferably configured to be less than the diameter of the toothed cable 2. This configuration allows preventing the toothed cable 2 from falling out of the opening.

In the present embodiment, the guide member 5 is routed, in a partially or fully curved path, to a mounting object to which the toothed cable 2 is to be mounted (for example, a vehicle and the like). In the example shown in FIG. 1, the guide member 5 has a guiding path 50 being curved in the length direction (below also called a curved path 50), and a guiding path 51 extending linearly in the length direction (below also called a linear path 51). The curvature of the curved path 50 is not particularly limited as long as the curvature is such that the toothed cable 2 can move smoothly without preventing the movement of the toothed cable 2. Moreover, as long as the guide member 5 can guide the toothed cable 2 to move the operation target 4 in a desired direction, the guide member 5 can be configured to have only the curved path 50 without having the linear path 51.

As shown in FIG. 3, the guide member 5 has an inner wall portion 501 and an outer wall portion 502. The inner wall portion 501 and an outer wall portion 502 constitutes the curved guiding path 50 to guide the toothed cable 2. The inner wall portion 501 is provided on the inner side in the diameter direction of the curvature, while the outer wall portion 502 is provided on the outer side in the diameter direction of the curvature. The interval (inner width) between the inner wall portion 501 and the outer wall portion 502 is not particularly limited as long as the interval is configured such that the toothed cable 2 can move smoothly thereover without preventing the movement of the toothed cable 2.

In the present embodiment, the guide member 5 is composed of a synthetic resin. In detail, the guide member 5 is formed by injection molding, for example. In the present embodiment, as shown in FIG. 3, the guide member 5 has a concave portion 5020 on a surface of the outer wall portion 502, which surface opposes the toothed cable 2. In the example shown in FIG. 3, the concave portion 5020 is a concave portion being recessed in a mortar shape, and, specifically, a concave portion being recessed in a substantially truncated cone shape. In the example shown in FIG. 3, the concave portion 5020 has a bottom surface 5022 along the length direction of the guide member 5 and a sloped surface 5023 being continuous with the bottom surface 5022. Moreover, in the example shown in FIG. 3, the sloped surface 5023 of the concave portion 5020 is composed of a curved surface to be convex inwardly. It should be noted that the concave portion 5020 can have a shape other than the mortar shape, so that the concave portion may be recessed in a cylindrical shape, for example. By the configuration of the outer wall portion 502 having the concave portion 5020, the flow of synthetic resin at the time of injection molding can be controlled. Therefore, it is possible to suppress generation of burrs on the guide member 5 at the time of mold removal in injection molding. It should be noted that the guide member 5 can be composed of a material other than the synthetic resin, such as a metal, for example.

It should be noted that the guide member 5 does not need to have a configuration having a substantially U-shaped cross section. For example, the guide member may be a cylindrical member having an inner diameter such that the toothed cable 2 can be housed therein. In other words, the guide member 5 can have a configuration covering the entire periphery of the toothed cable 2. The cross-sectional shape of the curved path 50 in a direction perpendicular to the center axis line X of the toothed cable 2 is not particularly limited as long as it is a cross-sectional shape such that the toothed cable 2 can move smoothly without movement of the toothed cable 2 being prevented.

The toothed cable 2 is guided and moves between the inner wall portion 501 and the outer wall portion 502 of the guide member 5 by the driving force of the drive source 3 and the toothed cable 2 transmits the above-mentioned driving force to the operation target 4. In the present embodiment, the guide member 5 has the curved path 50 and the linear path 51, so that the toothed cable 2 moves in the curved path 50 and the linear path 51 by the driving force of the drive source 3 to transmit the above-mentioned driving force to the operation target 4.

The drive source 3 drives the toothed cable 2. The drive source 3 is driven so as to move the toothed cable 2 along the length direction X1 by engaging with the toothed cable 2. In the present embodiment, the drive source 3 has an electric motor 31 and a gear mechanism to transmit the driving force of the electric motor 31 to the toothed cable 2. The gear mechanism includes a gear 32 to engage with a tooth ridge (a below-described convex portion C1) of the toothed cable 2. It should be noted the drive source 3 can have a configuration having a different type of prime mover in place of the electric motor 31.

The operation target 4 is connected to the toothed cable 2. The operation target 4 is operated by the toothed cable 2 moving along the length direction X1. The operation target 4 is not particularly limited as long as the operation target 4 can be operated by the toothed cable 2. For example, the operation target 4 can be an opening/closing body such as a sunroof, window glass, and the like of a vehicle. In the present embodiment, the operation target 4 is a sunroof of a vehicle, and the sunroof is slidably provided on one pair of left and right guide rails, not shown, provided on the ceiling of the vehicle. The operation target 4 is directly or indirectly connected to one end of the toothed cable 2. In the present embodiment, the gear 32 is rotated by the driving force of the drive source 3, and the toothed cable 2 engaged with the teeth of the gear 32 moves along the length direction of the guide member 5 while the toothed cable 2 is guided by the guide member 5. In conjunction with the movement of the toothed cable 2, the operation target 4 is operated.

As shown in FIG. 2, the toothed cable 2 comprises a cable body 21, and a cap 22 provided at a tip of the cable body 21.

The toothed cable 2 moves in the guiding path (the curved path 50 and the linear path 51) of the guide member 5. As shown in FIG. 3, when the toothed cable 2 moves in a direction D1 from a side of the cap 22 toward a side of the cable body 21 in the guiding path (specifically the curved path 50) of the guide member 5, the toothed cable 2 moves such that the cap 22 is in sliding contact with the outer wall portion 502.

The cable body 21 has flexibility and is guided along the curved path 50 in a curved state. The cable body 21 is partially extended substantially linearly when no external force is applied to the cable body 21. Therefore, in the curved path 50, the toothed cable 2 contacts the inner wall portion 501 at or near a central portion in the length direction of the curved path 50 in a region in which the toothed cable 2 is present and is likely to follow the outer wall portion 502 having a smaller curvature than that of the inner wall portion 501 as the toothed cable 2 approaches its tip (below, a portion of the toothed cable 2, which contacts the inner wall portion 501 at or near the central portion described above in the curved path 50, is also called a central contacting portion). In other words, in the curved path 50, as the toothed cable 2 approaches its tip with respect to the central contacting portion, the toothed cable 2 has a strong tendency to be likely to follow the outer wall portion 502 (be likely to approach the outer wall portion 502) having a smaller curvature than that of the inner wall portion 501. Moreover, while the cable body 21 has flexibility, the cable body 21 at a portion with a certain short length shows resistance to bending due to an external force applied in a direction perpendicular to the length direction X1. The above-mentioned external force is a below-described force F1 to be applied to a below-described end region 214 of the cable body 21 by the inner wall portion 501 when the end region 214 contacts the inner wall portion 501. Moreover, the above-mentioned short length is a distance from the below-described end region 214 to the cap 22, for example.

In the present embodiment, as shown in FIG. 2, the cable body 21 comprises a core cable 210, and a coil portion 211 being spirally wound around the outer periphery of the core cable 210. The core body 21 has a convex portion C1 to be formed by the coil portion 211 wound spirally, and a concave portion C2 to be formed between one pair of convex portions C1 neighboring in the length direction X of the toothed cable 2. In the toothed cable 2, the teeth of the gear 32 engaging with the concave portion C2 of the cable body 21 causes the toothed cable 2 to be driven in the length direction X1 to transmit the driving force of the drive source 3 to the operation target 4. The structure of the cable body 21 is not particularly limited as long as the cable body 21 is flexible and has a configuration having a convex potion and a concave portion meshing with the gear 32. In the present embodiment, the cable body 21 comprises a covering layer 212 continuously covering the convex portion C1 and the concave portion C2 with a resin, and a flocked yarn 213 being spirally wound along the concave portion C2 on the covering layer 212 and fused to the covering layer 212. As shown in FIG. 2, the flocked yarn 213 comprises a core yarn 2131, and a plurality of piles 2132 extending radially from the core yarn 2131. The operation target 4 is connected directly or indirectly to one end of the cable body 21.

In the present embodiment, the cap 22 is provided at an end of the cable body 21. In detail, the cap 22 is not provided at one end of the cable body 21, but is provided at the other end of the cable body 21. Since the toothed cable 2 comprises the cap 22, the tip of the toothed cable 2 is less likely to be caught on the inner surface of the guide member 5. Therefore, the toothed cable 2 can easily move smoothly inside the guide member 5.

As shown in FIG. 2, the cap 22 comprises a substantially conical tip portion 221 and a substantially cylindrical body portion 222 to be provided on the base end side of the tip portion 221. The cap 22 is a portion to be in sliding contact with the guide member 5. The cap 22 is composed of a material having at least a certain degree of rigidity and a certain degree or less of coefficient of friction (coefficient of dynamic friction and coefficient of static friction) with respect to the guide member 5, and the cap 22 can be composed of a synthetic resin such as a polyacetal resin (POM), for example. The cap 22 can be composed of a material of a different type, such as a metal, as long as the material has at least a certain degree of rigidity and a certain degree or less of coefficient of friction with respect to the guide member 5.

In the present specification, the term "substantially conical" in the term "substantially conical tip portion 221" includes a truncated cone shape in addition to a conical shape. In the present embodiment, as shown in FIG. 2, the tip portion 221 is formed in a truncated cone shape. The tip portion 221 can be formed in a conical shape. The substantially conical tip portion 221 can be formed with a tip 224 being chamfered with a rounded surface or the like. A boundary portion 223 between the tip portion 221 and the body portion 222 can be configured to be chamfered with a rounded surface or the like. In the present embodiment, the boundary portion 223 between the tip portion 221 and the body portion 222 is chamfered with a rounded surface. The boundary portion 223 between the tip portion 221 and the body portion 222 can be configured to be not chamfered.

As shown in FIG. 3, the toothed cable 2 is configured such that the end region 214 of the cable body 21, which end region 214 is on the cap 22 side, contacts the inner wall portion 501 of the guide member 5 when the tip portion 221 of the cap 22 comes into sliding contact with an edge 5021 of the concave portion 5020 of the guide member 5 to limit an angle θ at which the cap 22 swings in an orientation in which the tip 224 of the cap 22 approaches the outer wall portion 502.

To limit the angle θ at which the cap 22 swings (below also called an swing angle), in the example shown in FIG. 3, the body portion 222 has a length such that the end region 214 of the cable body 21 on the cap 22 side contacts the inner wall portion 501 of the guide member 5 when the tip portion 221 of the cap 22 comes into sliding contact with the edge 5021 (the edge 5021 on the rear side in a direction D1 in the example shown in FIG. 3) of the concave portion 5020 of the guide member 5. In detail, a length L of the body portion 222 in the length direction X1 of the toothed cable 2 is greater than a width W1 of the concave portion 5020 of the guide member 5. In the example shown in FIG. 3, the length L of the body portion 222 is greater than the width W1 of the concave portion 5020 including the bottom surface 5022 and the sloped surface 5023.

The end region 214 means an end of the cable body 21 on the cap 22 side or a region near the above-mentioned end. In the example shown in FIG. 3, the end region 214 is a region near the end of the cable body 21 on the cap 22 side. In detail, the end region 214 is a region that can receive, from the inner wall portion 501, a force F1 limiting the swing angle θ of the cap 22 by contacting the inner wall portion 501 (or a force in a direction opposite to the swing direction of the cap 22). Even in a case that a region of the cable body 21, which region is farther from the cap 22, contacts the inner wall portion 501, as the cable body 21 has flexibility, the above-mentioned region cannot receive, from the inner wall portion 501, the force F1 which can limit the swing angle θ of the cap 22.

In the example shown in FIG. 3, the toothed cable 2 moves from the position with the solid line to the position with the dashed line to cause the cap 221 to swing (rotate counterclockwise in FIG. 3). This is because, as described above, in the curved path 50, the toothed cable 2 contacts the inner wall portion 501 at or near a central portion in the length direction of the curved length 50 in a region in which region the toothed cable 2 is present, and has a strong tendency to be likely to follow the outer wall portion 502 (be likely to approach the outer wall portion 502) having a smaller curvature than that of the inner wall portion 501 as the toothed cable 2 approaches its tip from a portion contacting the inner wall portion 501 (the above-mentioned central contacting portion). When the cap 22 swings as mentioned above, the end region 214 of the cable body 21 on the cap 22 side contacts the inner wall portion 501 of the guide member 5. Therefore, an increase in swing, or in other words, the swing angle θ, of the cap 22 is suppressed. In detail, when the end region 214 of the cable body 21 contacts the inner wall portion 501, the end region 214 receives, from the inner wall portion 501, the force F1 limiting the swing angle θ of the cap 22 (a force in a direction opposite to the swing direction of the cap 22). Therefore, an increase in the swing angle θ of the cap 22 can be suppressed. It should be noted that even when the cap 22 moves in the direction D1 from the state shown with the chain double-dashed line in FIG. 3, as the end region 214 of the cable body 21 receives the force F1 limiting the swing angle θ of the cap 22, an increase in the swing angle θ of the cap 22 continues to be suppressed.

According to the present embodiment, the end region 214 of the cable body 21 on the cap 22 side contacts the inner wall portion 501 of the guide member 5 when the tip portion 221 of the cap 22 comes into sliding contact with the edge 5021 of the concave portion 5020 of the guide member 5. Therefore, an increase in the angle θ at which the cap 22 swings in an orientation in which the tip 224 of the cap 22 approaches the outer wall portion 224 is suppressed. Conventionally, there is an occurrence of a problem, which problem is that the end region of the cable body on the cap side is configured to not contact the inner wall portion 501 of the guide member 5 when the tip portion of the cap comes into sliding contact with the edge 5021 of the concave portion 5020 of the guide member 5. The cap swings considerably (with the swing angle θ being large) in an orientation in which the tip of the cap approaches the outer wall portion 502. Thereby causing the tip portion of the cap to strongly collide with the edge 5021 of the concave portion 5020 of the guide member 5, generating a tapping sound. On the other hand, according to the present embodiment, since the end region 214 of the cable body 21 on the cap 22 side contacts the inner wall portion 501 of the guide member 5 when the tip portion 221 of the cap 22 comes into sliding contact with the edge 5021 of the concave portion 5020 of the guide member 5, the cap 22 receives, from the inner wall portion 501 of the guide member 5, the force F1 in an orientation opposite to the rotational force in an orientation in which the cap 22 is likely to swing in an orientation in which the tip 224 of the cap 22 approaches the outer wall portion 502. Therefore, an increase in the angle θ at which the cap 22 swing in an orientation in which the tip 224 of the cap 22 approaches the outer wall portion 502 of the guide member 5 is suppressed. Therefore, the swing angle θ of the cap 22 becomes smaller than in the conventional case so that the tip portion 221 of the cap 22 is less likely to collide with the edge 5021 of the concave portion 5020 of the guide member 5. Further, even when a collision occurs, since the degree of collision becomes weaker, it is possible to suppress generation of a tapping sound.

In more detail, in the example shown in FIG. 3, it is configured that the body portion 222 of the cap 22 has a specific length as described above, or in other words, the length L of the body portion 222 in the length direction X of the toothed cable 2 is longer than the width W1 of the concave portion 5020 of the guide member 5. By the configuration, the end region 214 of the cable body 21 on the cap 22 side contacts the inner wall portion 501 of the guide member 5 with the angle θ at which the cap 22 swings in an orientation in which the tip 224 of the cap 22 approaches the outer wall portion 502 being small in comparison to a case in which the length of the body portion 222 is shorter than the specific length. Therefore, it is possible to suppress generation of a tapping sound with a simple configuration to have a specific length of the body portion 222 of the cap 22.

Next, an operation of the toothed cable guiding apparatus 1 will be described with reference to FIGS. 1 to 3. Here, a case will be described of carrying out, using the toothed cable guiding apparatus 1, an operation of opening/closing a sunroof of a vehicle, being one example of the operation target 4.

FIG. 1 shows the operation target 4 in a closed state. Moreover, in the example shown in FIG. 1, the toothed cable 2 to engage with a tooth of the gear 32 on the upper side of the gear 32 in FIG. 1 (below also called an upper cable 2) and the toothed cable 2 to engage with a tooth of the gear 32 on the lower side of the gear 32 in FIG. 1 (below also called a lower cable 2) are provided. One end of the upper cable 2 is connected to a left side portion of the operation target 4 in FIG. 1. Moreover, one end of the lower cable 2 is connected to a right side portion of the operation target 4 in FIG. 1. In the present embodiment, the cap 22 is not provided at one end of the upper cable 2 or at one end of the lower cable 2. The other end of the upper cable 2 is a free end. The cap 22 is provided at the other end of the upper cable 2. When the operation target 4 is in the closed state, the other end of the upper cable 2 is located between an end 52, which is on a side opposite to the operation target 4, of the guide member 5 and the curved path 50 on a side being closer to the end 52. The other end of the lower cable 2 is also similar to the upper cable 2.

Then, when the gear 32 rotates in a counterclockwise direction in FIG. 1 by the driven electric motor 31, the lower cable 2 moves in a direction away from the end 52 of the guide member 5 inside the guide member 5. In this way, the other end of the lower cable 2 moves in the direction D1 (see FIG. 3) inside the curved path 50. The same also applies to the upper cable 2. On the other hand, when the gear 32 rotates in a clockwise direction in FIG. 1 by the driven electric motor 31, the lower cable 2 moves in a direction approaching the end 52 of the guide member 5 inside the guide member 5. In this way, the other end of the lower cable 2 moves in a direction opposite to the direction D1 inside the curved path 50. The same also applies to the upper cable 2.

As shown in FIG. 3, the cap 22 provided at the other end of the lower cable 2 moves in the direction D1 to pass near the concave portion 5020 of the guide member 5. In detail, as described above, the end region 214 of the cable body 21 on the cap 22 side contacts the inner wall portion 501 of the guide member 5 when the tip portion 221 of the cap 22 comes into sliding contact with the edge 5021 of the concave portion 5020 of the guide member 5. Thereby an increase in the swing angle θ of the cap 22 is suppressed. Therefore, the tip portion 221 of the cap 22 is less likely to collide with the edge 5021 of the concave portion 5020 of the guide member 5. Further, even when a collision occurs, the degree of collision becomes weaker, and it is possible to suppress generation of a tapping sound. The same also applies to the upper cable 2. In this way, the operation target 4 can be opened while suppressing generation of a tapping sound. It should be noted that when the upper cable 2 and the lower cable 2 move in a direction opposite to the direction D1, the tapping sound as described above is less likely to be generated in comparison to a case in which the upper cable 2 and the lower cable 2 move in the direction D1.

Figure 5:
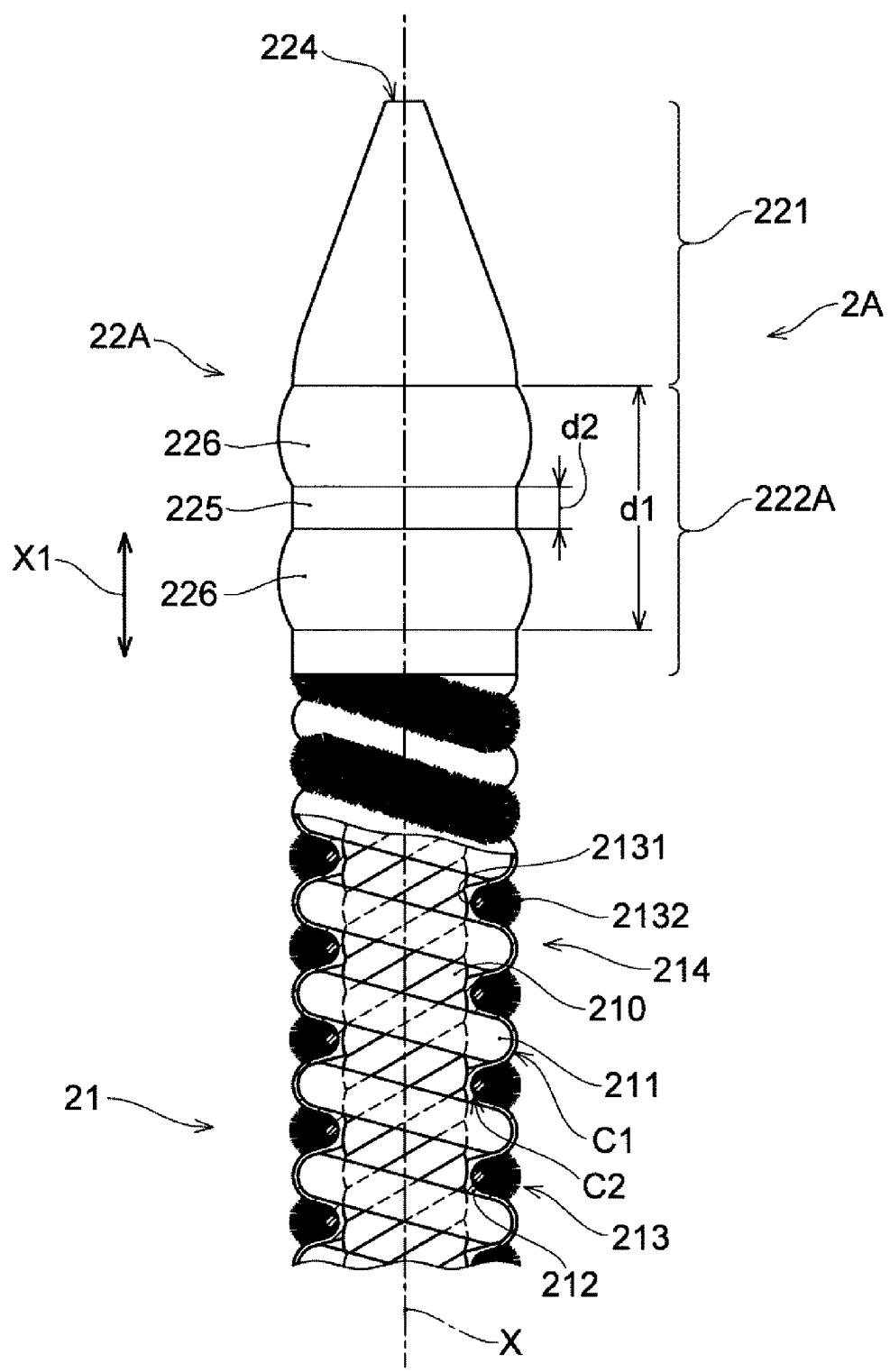
FIG. 5 is a view showing, in a solid line, the toothed cable (a second example) of one embodiment of the present invention.
Figure 6:
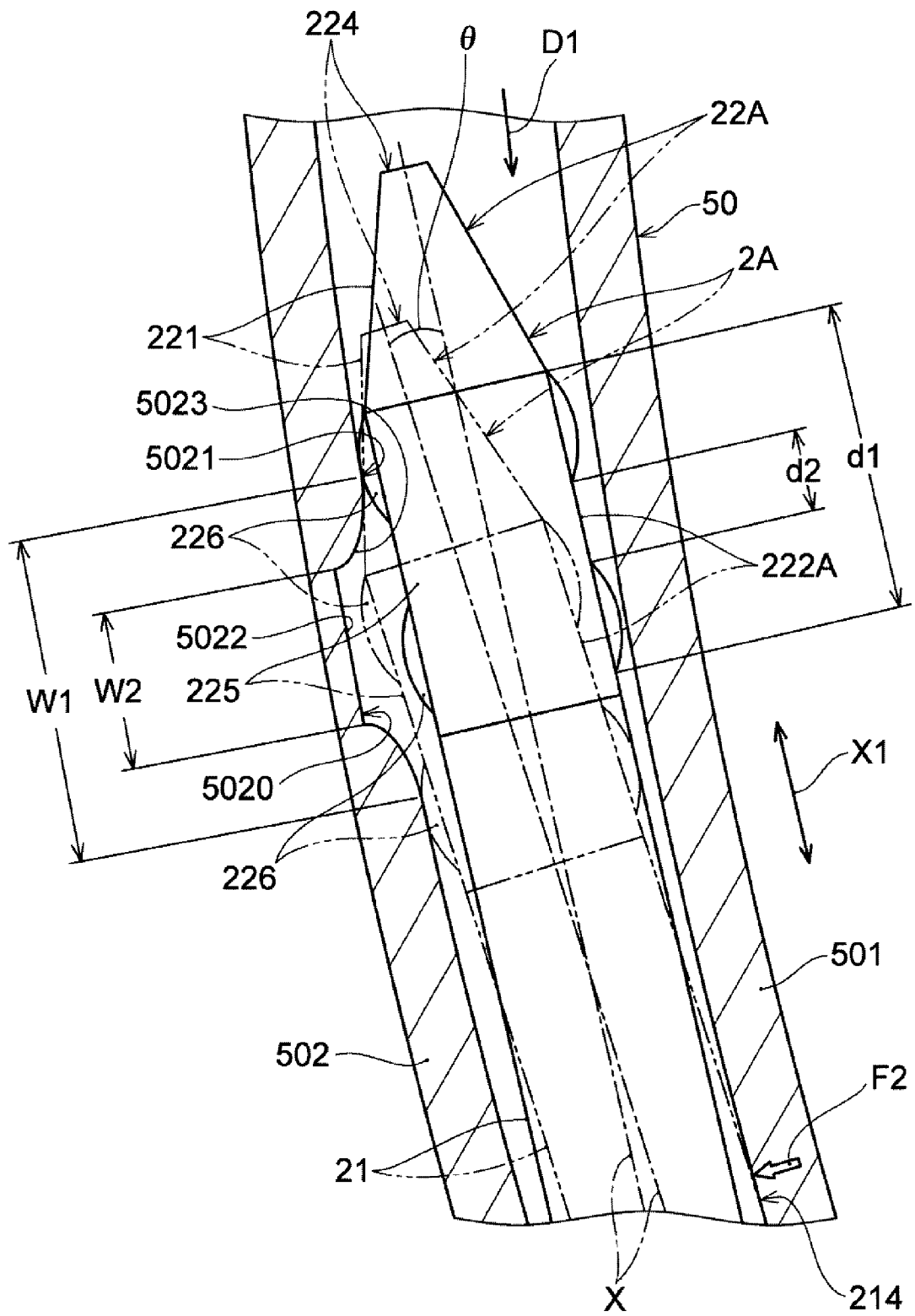
FIG. 6 is a view schematically showing one example of the behavior when the toothed cable (the second example) passes near the concave portion of the guide member.

As a variation of the above-described embodiment, as shown in FIGS. 5 and 6, a configuration comprising a cap 22A with a shape modified from that in the above-described embodiment can be provided.

Figure 7A:
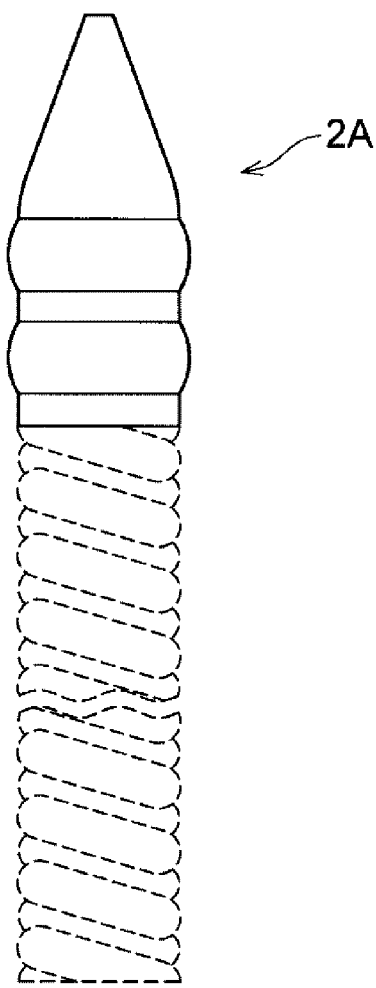
FIG. 7A is a front view showing, in a solid line, a characterizing portion of the toothed cable (the second example) of one embodiment of the present invention.
Figure 7B:
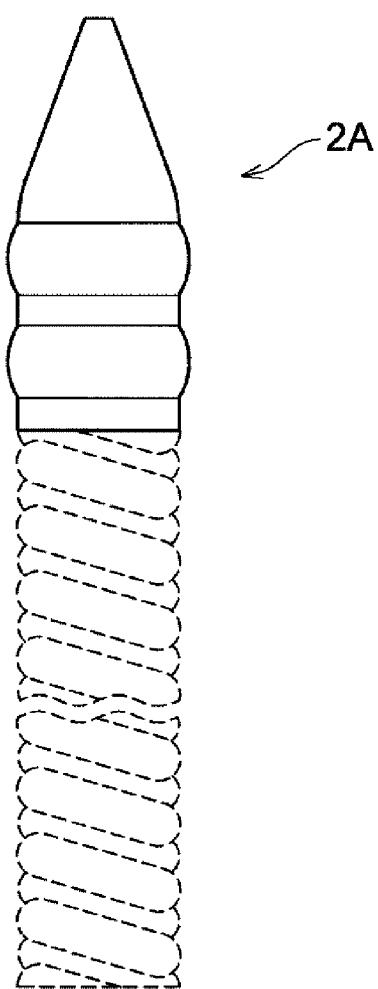
FIG. 7B is a rear view showing, in a solid line, a characterizing portion of the toothed cable (the second example) of one embodiment of the present invention.
Figure 7C:
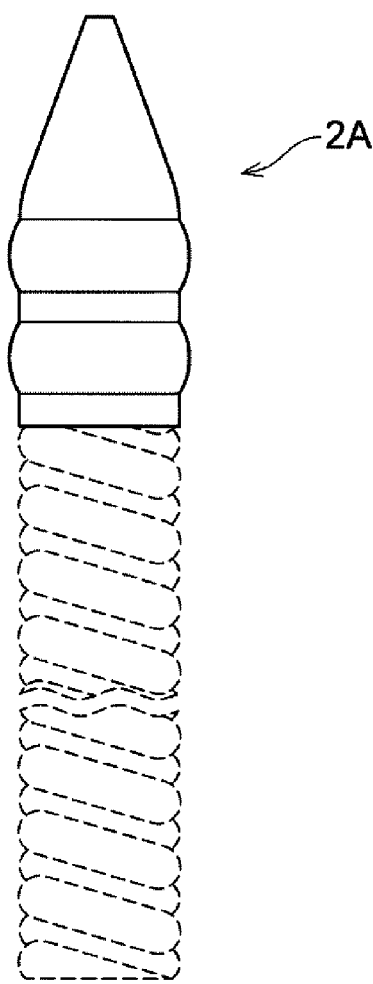
FIG. 7C is a right side view showing, in a solid line, a characterizing portion of the toothed cable (the second example) of one embodiment of the present invention.
Figure 7D:
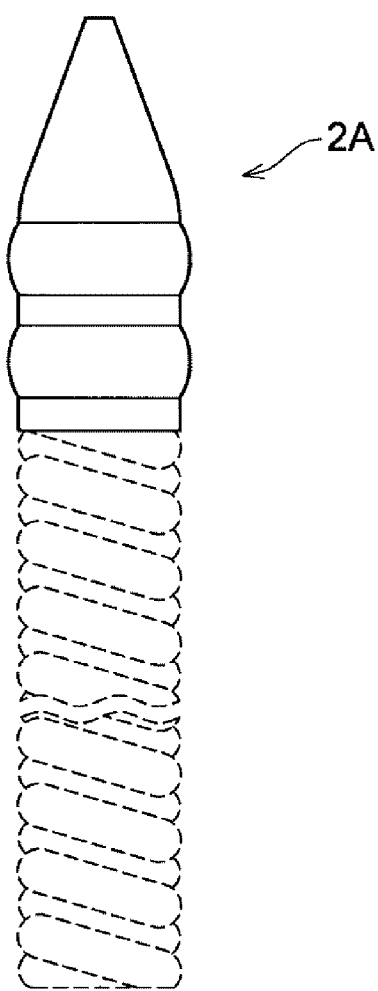
FIG. 7D is a left side view showing, in a solid line, a characterizing portion of the toothed cable (the second example) of one embodiment of the present invention.
Figure 7E:
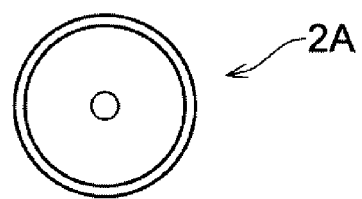
FIG. 7E is a plan view showing, in a solid line, a characterizing portion of the toothed cable (the second example) of one embodiment of the present invention.
Figure 7F:
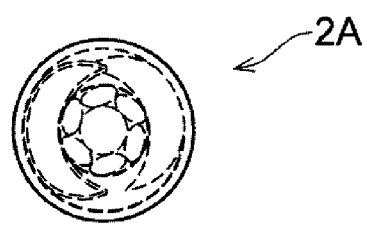
FIG. 7F is a bottom view showing, in a solid line, a characterizing portion of the toothed cable (the second example) of one embodiment of the present invention.

FIG. 5 is a view showing the toothed cable (a second example) of one embodiment of the present invention. FIG. 6 is a view schematically showing one example of the behavior when the toothed cable (the second example) passes near the concave portion of the guide member. FIG. 7A is a front view showing, in a solid line, a characterizing portion of the toothed cable (the second example) of one embodiment of the present invention. FIG. 7B is a rear view showing, in a solid line, a characterizing portion of the toothed cable (the second example) of one embodiment of the present invention. FIG. 7C is a right side view showing, in a solid line, a characterizing portion of the toothed cable (the second example) of one embodiment of the present invention. FIG. 7D is a left side view showing, in a solid line, a characterizing portion of the toothed cable (the second example) of one embodiment of the present invention. FIG. 7E is a plan view showing, in a solid line, a characterizing portion of the toothed cable (the second example) of one embodiment of the present invention. FIG. 7F is a bottom view showing, in a solid line, a characterizing portion of the toothed cable (the second example) of one embodiment of the present invention. Besides, below, explanations will be given primarily on the differences with the above-described embodiment, so that explanations on the configuration common to the above-described embodiment will be omitted.

In the present variation, as shown in FIGS. 5 and 6, a body portion 222A of the cap 22A has a cylindrical portion 225 extending along the longitudinal direction of the cap 22A and a ring-shaped portion 226 being provided along the circumferential direction on the outer peripheral surface of the cylindrical portion 225 and projecting outwardly in the diameter direction of the cylindrical portion 225.

The cylindrical portion 225 is a substantially circular cylindrical portion to be provided on the base end side of the tip portion 221 of the cap 22A.

The ring-shaped portion 226 is a portion to partially increase the diameter of the body portion 222A. By partially increasing the diameter of the body portion 222A, the cap 22A and the cable body 21 are positioned closer to the inner wall portion 501 of the guide member 5 in comparison to a cap without the ring-shaped portion. To bring the position of the cap 22A and the cable body 21 closer to that of the inner wall portion 501 of the guide member 5, the greater the outer diameter of the ring-shaped portion 226 the more preferable. The outer diameter of the ring-shaped portion 226 can be increased in a range such that a toothed cable 2A can move smoothly without the movement of the toothed cable 2A inside the guide member 5 being prevented.

In the present embodiment, two ring-shaped portions 226 are provided along the length direction X1 of the toothed cable 2A. The number of the ring-shaped portions 226 is not particularly limited as long as it is the number such that the toothed cable 2A can move smoothly without the movement of the toothed cable 2A inside the guide member 5 being prevented.

In a case that the ring-shaped portion 226 is provided in a plurality, the interval between the ring-shaped portion 226 on the side closest to the tip portion 221 (below also called the tip-side ring-shaped portion 226) and the ring-shaped portion 226 on the side closest to the cable body 21 (below also called the cable-side ring-shaped portion 226) (for example, as shown in FIG. 5, a distance d1 between the end of the tip-side ring-shaped portion 226 on the tip portion 221 side and the end of the cable-side ring-shaped portion 226 on the cable body 21 side) is preferably an interval such that, at the time a part of the cable-side ring-shaped portion 226 goes beyond the bottom surface 5022 of the concave portion 5020 in the length direction X1 when the cap 22A passes the concave portion 5020 of the guide member 5, at least a part of the tip-side ring-shaped portion 226 in the length direction X1 is located on the outer side of the bottom surface 5022 of the concave portion 5020 (the tip-side ring-shaped portion 226 has yet to enter at all the concave portion 5020 or the tip-side ring-shaped portion 226 has entered the concave portion 5020, but the tip-side ring-shaped portion 226 has not entered completely). By the interval as mentioned above, it is possible to reduce the possibility of the tip portion 221 colliding with the edge 5021 of the concave portion 5020 with the swing angle θ increasing.

In the example shown in FIG. 6, an interval d1 between the end of the tip-side ring-shaped portion 226 on the tip portion 221 side and the end of the cable-side ring-shaped portion 226 on the cable body 21 side (see FIG. 5) is an interval such that, at the time a part of the cable-side ring-shaped portion 226 goes beyond the bottom surface 5022 of the concave portion 5020 in the length direction X1 of the toothed cable 2A when the cap 22A passes the concave portion 5020 of the guide member 5, a part or all of the tip-side ring-shaped portion 226 in the length direction X1 is located on the outer side of the bottom surface 5022 of the concave portion 5020 (the tip-side ring-shaped portion 226 is on the sloped surface 5023 of the concave portion 5020 on a side opposite to the direction D1 or on a wall surface on a side opposite to the direction D1 with respect to the sloped surface 5023). It should be noted that FIG. 6 shows a state in which the entirety of the tip-side ring-shaped portion 226 in the length direction X1 floats in the concave portion 5020 at the time the entirety of the cable-side ring-shaped portion 226 in the length direction X1 goes beyond the concave portion 5020. In detail, the example shown in FIG. 6 has a configuration in which a distance d1 between the end of the tip-side ring-shaped portion 226 on the tip portion 221 side and the end of the cable-side ring-shaped portion 226 on the cable body 21 side is greater than a width W2 of the bottom surface 5022 of the concave portion 5020. In addition to such a configuration, a distance d2 between the end of the tip-side ring-shaped portion 226 on the cable body 21 side and the end of the cable-side ring-shaped portion 226 on the tip portion 221 side (see FIG. 5) can be configured to be greater than the width W2 of the bottom surface 5022 of the concave portion 5020.

The interval d1 between the end of the tip-side ring-shaped portion 226 on the tip portion 221 side and the end of the cable-side ring-shaped portion 226 on the cable body 21 side (see FIG. 5) can be an interval such that, at the time a part of the cable-side ring-shaped portion 226 goes beyond the concave portion 5020 of the guide member 5 in the length direction X1 of the toothed cable 2A when the cap 22A passes the concave portion 5020, a part or all of the tip-side ring-shaped portion 226 in the length direction X1 is located on the outer side of the concave portion 5020 (the tip-side ring-shaped portion 226 is on the sloped surface 5023 of the concave portion 5020 on a side opposite to the direction D1 or on a wall surface on a side opposite to the direction D1 with respect to the sloped surface 5023). In detail, for example, the distance d1 between the end of the tip-side ring-shaped portion 226 on the tip portion 221 side and the end of the cable-side ring-shaped portion 226 on the cable body 21 side is configured to be greater than the width W1 of the concave portion 5020. Moreover, the distance d2 between the end of the tip-side ring-shaped portion 226 on the cable body 21 side and the end of the cable-side ring-shaped portion 226 on the tip portion 221 side can be configured to be greater than the width W1 of the concave portion 5020.

Moreover, when the ring-shaped portion 226 is cut along the length direction X1 of the toothed cable 2A, the cross-sectional shape of the ring-shaped portion 226 is preferably a shape such that the contact area with the guide member 5 can be reduced to reduce the sliding resistance. For example, as shown in FIG. 6, the cross-sectional shape of the ring-shaped portion 226 is preferably a shape such as to project in a cross-sectionally arc shape from the cylindrical portion 225.

According to the present variation, the position of the cap 22A and the cable body 21 becomes closer to that of the inner wall portion 501 of the guide member 5 in comparison to a cap without the ring-shaped portion, so that the end region 214 of the cable body 21 on the cap 22A side contacts the inner wall portion 501 of the guide member 5 with the angle (swing angle) θ in an orientation in which the cap 22A swings in an orientation in which the tip 224 of the cap 22A approaches the outer wall portion 502, the angle θ being small. By contacting the end region 214 of the cable body 21 with the inner wall portion 501 of the guide member 5, the cap 22A receives, from the inner wall portion 501 of the guide member 5, a force F2 in an orientation opposite to the rotational force in an orientation in which the cap 22A is likely to swing in an orientation in which the tip 224 of the cap 22A approaches the outer wall portion 502 of the guide member 5. Therefore, an increase in the angle θ at which the cap 22A swings in an orientation in which the tip 224 of the cap 22A approaches the outer wall portion 502 of the guide member 5 is suppressed. Therefore, generation of a tapping sound can be suppressed with a simple configuration of providing the cap 22A with the ring-shaped portion 226. While it is also possible to increase the diameter of the entirety of the body portion 222A of the cap 22A, in comparison to a case in which the diameter of the entirety of the body portion 222A is increased in this way, in the present variation, the contact area of the body portion 222A and the guide member 5 can be reduced to reduce the sliding resistance to smoothly move the toothed cable 2A inside the guide member 5.

Figure 8:
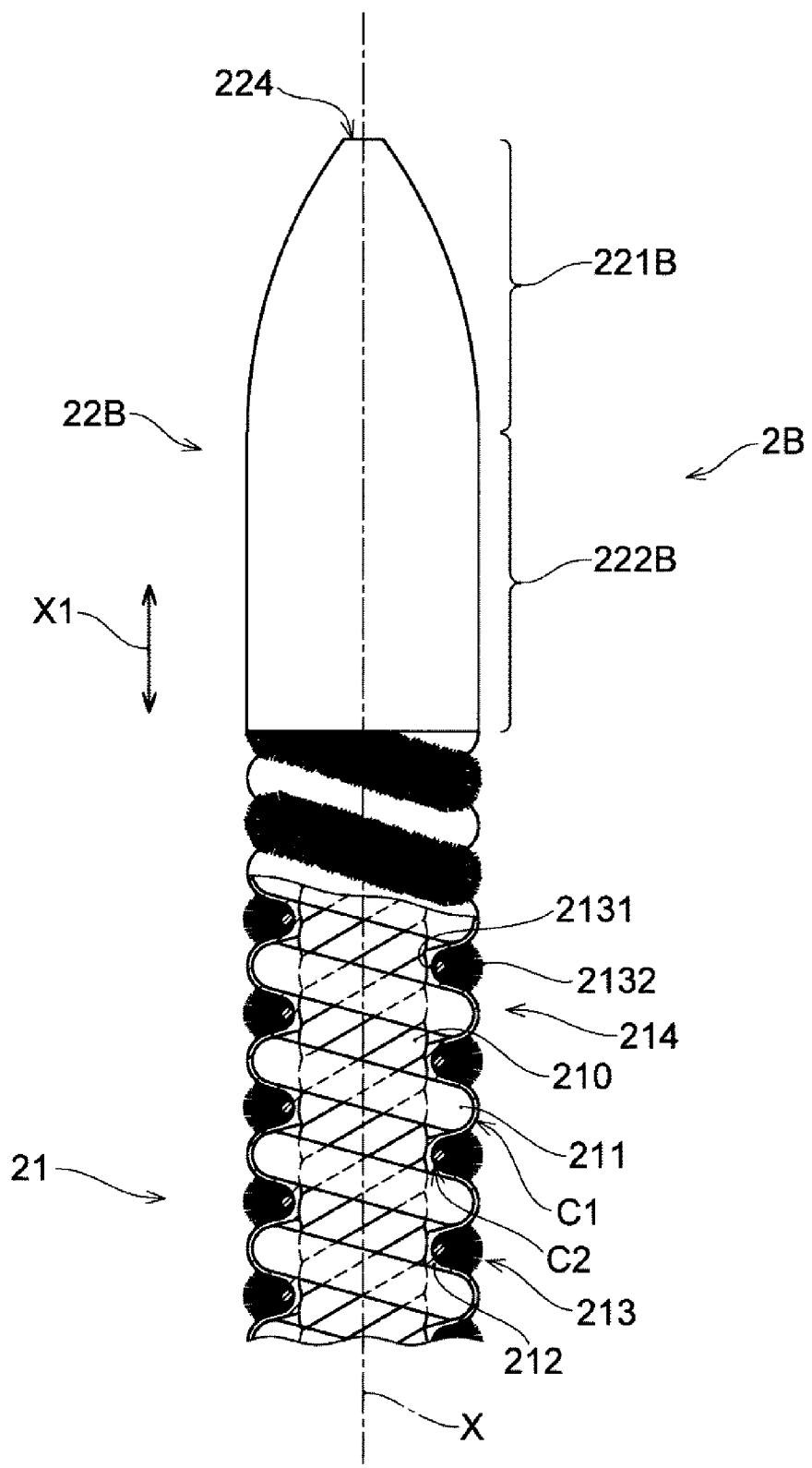
FIG. 8 is a view showing, in a solid line, the toothed cable (a third example) of one embodiment of the present invention.
Figure 9:
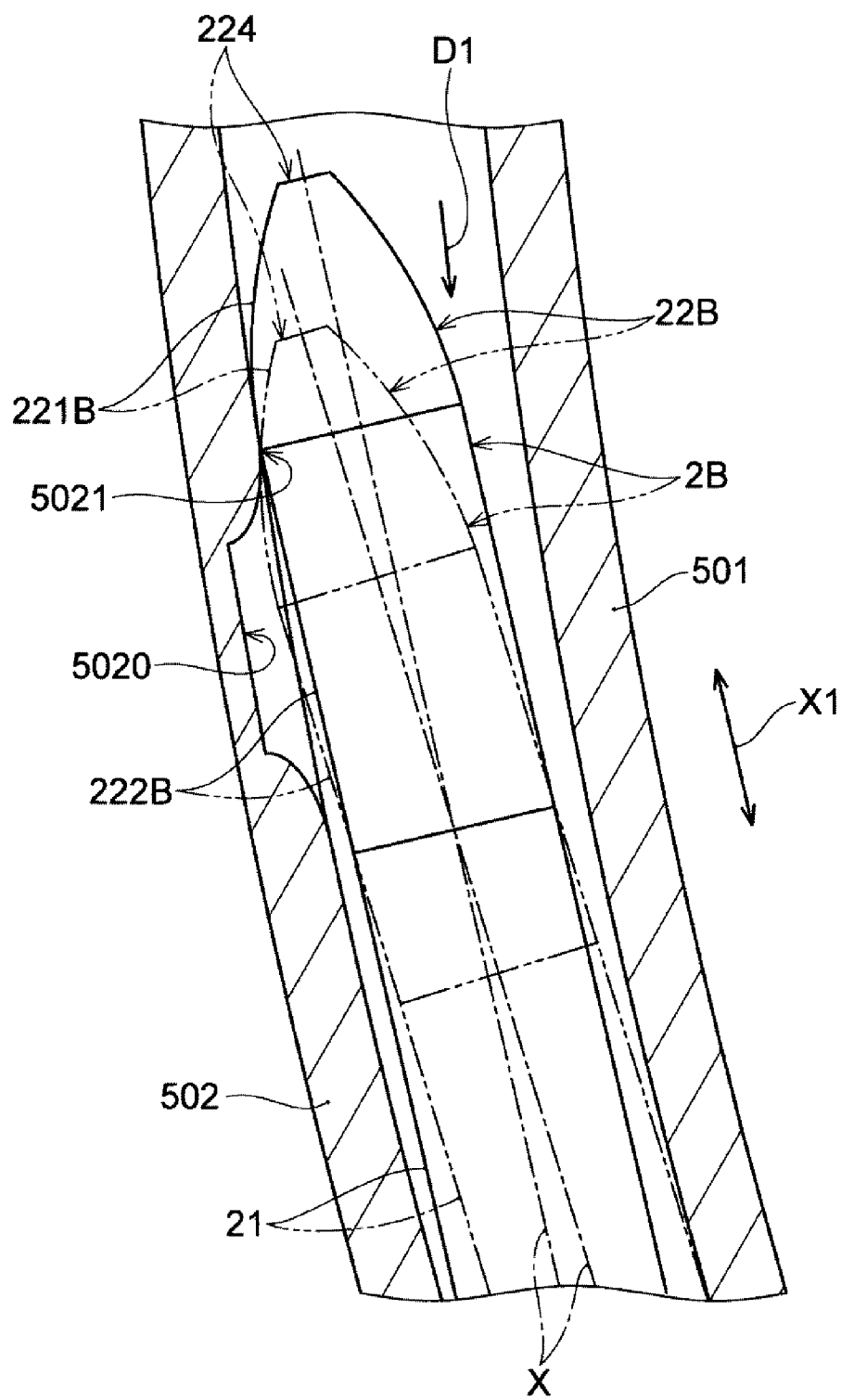
FIG. 9 is a view schematically showing one example of the behavior when the toothed cable (the third example) passes near the concave portion of the guide member.

Besides, a further variation of the above-described embodiment, as shown in FIGS. 8 and 9, can be configured to comprise a cap 22B in which the shape thereof is modified from that of the above-described embodiment.

Figure 10A:
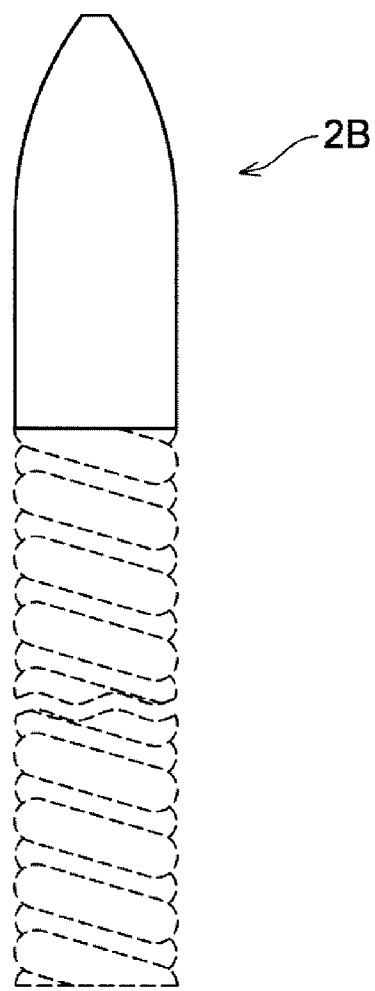
FIG. 10A is a front view showing, in a solid line, a characterizing portion of the toothed cable (the third example) of one embodiment of the present invention.
Figure 10B:
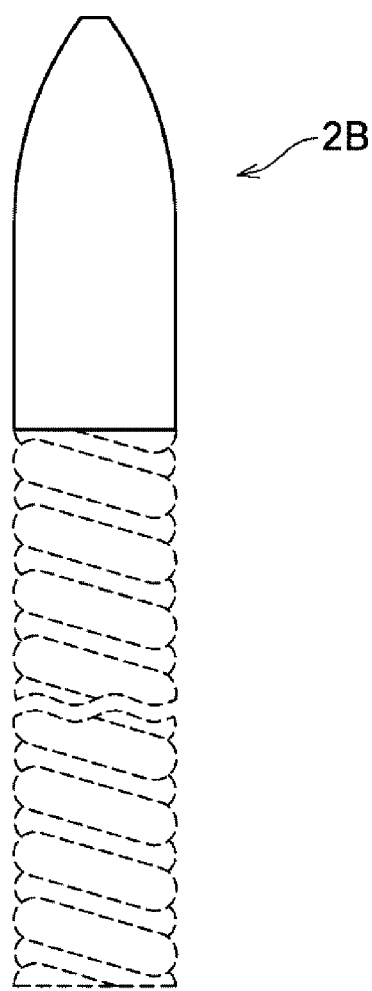
FIG. 10B is a rear view showing, in a solid line, a characterizing portion of the toothed cable (the third example) of one embodiment of the present invention.
Figure 10C:
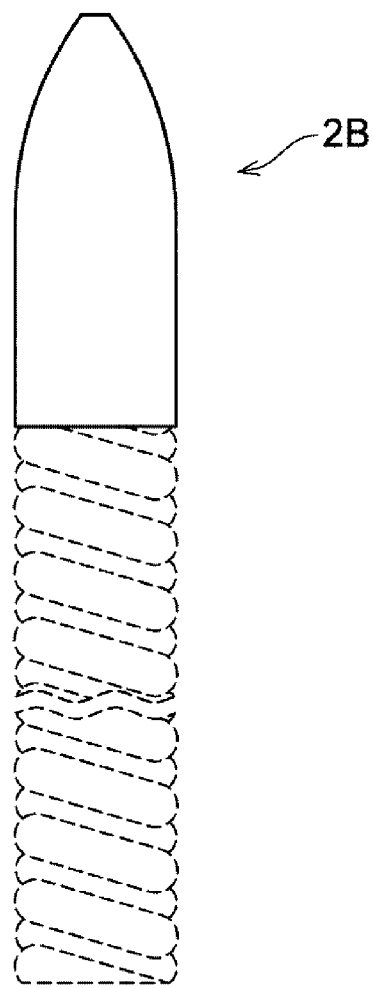
FIG. 10C is a right side view showing, in a solid line, a characterizing portion of the toothed cable (the third example) of one embodiment of the present invention.
Figure 10D:
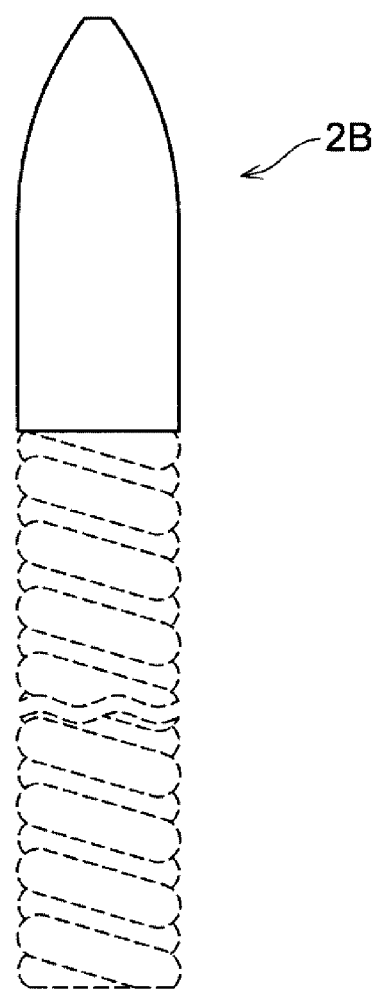
FIG. 10D is a left side view showing, in a solid line, a characterizing portion of the toothed cable (the third example) of one embodiment of the present invention.
Figure 10E:
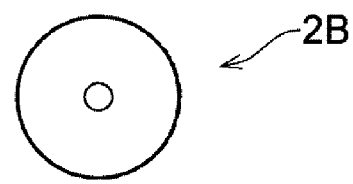
FIG. 10E is a plan view showing, in a solid line, a characterizing portion of the toothed cable (the third example) of one embodiment of the present invention.
Figure 10F:
FIG. 10F is a bottom view showing, in a solid line, a characterizing portion of the toothed cable (the third example) of one embodiment of the present invention.

FIG. 8 is a view showing the toothed cable (a third example) of one embodiment of the present invention. FIG. 9 is a view schematically showing one example of the behavior when the toothed cable (the third example) passes near the concave portion of the guide member. FIG. 10A is a front view showing, in a solid line, a characterizing portion of the toothed cable (the third example) of one embodiment of the present invention. FIG. 10B is a rear view showing, in a solid line, a characterizing portion of the toothed cable (the third example) of one embodiment of the present invention. FIG. 10C is a right side view showing, in a solid line, a characterizing portion of the toothed cable (the third example) of one embodiment of the present invention. FIG. 10D is a left side view showing, in a solid line, a characterizing portion of the toothed cable (the third example) of one embodiment of the present invention. FIG. 10E is a plan view showing, in a solid line, a characterizing portion of the toothed cable (the third example) of one embodiment of the present invention. FIG. 10F is a bottom view showing, in a solid line, a characterizing portion of the toothed cable (the third example) of one embodiment of the present invention. Besides, below, explanations will be given primarily on the differences with the above-described embodiment, so that explanations on the configuration common to the above-described embodiment will be omitted.

In the present variation, as shown in FIGS. 8 and 9, the outer peripheral surface of a tip portion 221B of a cap 22B has a curved shape bulging outwardly in the diameter direction. A toothed cable 2B is configured such that the tip portion 221B of the cap 22B comes into sliding contact with the edge 5021 of the concave portion 5020 of the guide member 5 to suppress the velocity at which the cap 22B swings in an orientation in which the tip 224 of the cap 22B approaches the outer wall portion 502.

The curvature of the outer peripheral surface of the tip portion 221B of the cap 22B, or specifically, the curvature of the outer peripheral surface with the tip portion 221B of the cap 22B being cut along the length direction X1 of the toothed cable 2B is not particularly limited as long as it is a curvature at which the swing velocity of the cap 22B can be suppressed. Moreover, the length of the tip portion 221B of the cap 22B of the toothed cable 2B in the length direction X1 is not particularly limited as long as the length is a length at which the above-described swing velocity of the cap 22B can be suppressed while taking into account the curvature of the outer peripheral surface. Moreover, the length of the body portion 222B can be shorter than that of the body portion 222 shown in FIG. 2.

In the present variation, the outer peripheral surface of the tip portion 221B of the cap 22B has a curved shape bulging outwardly in the diameter direction. Accordingly, when the tip portion 221B of the cap 22B comes into sliding contact with the edge 5021 of the concave portion 5020 of the guide member 5, the velocity at which the cap 22B swings in an orientation in which the tip 224 of the cap 22B approaches the outer wall portion 502 is suppressed. Therefore, the velocity at which the cap 22B falls into the concave portion 5020 is suppressed. Conventionally, the outer peripheral surface of the tip portion of the cap has a shape not bulging outwardly in the diameter direction. Therefore, the velocity at which the cap swings in an orientation in which the tip of the cap approaches the outer wall portion 502 is large. Thereby, there is an occurrence of a problem, which is that, the tip portion of the cap collides strongly with the edge 5021 of the concave portion 5020 of the guide member 5, so that a tapping sound is generated. On the other hand, according to the present embodiment, as described above, the outer peripheral surface of the tip portion 221B of the cap 22B has a curved shape bulging outwardly in the diameter direction. Such an outer peripheral surface having a curved shape comes into sliding contact with the edge 5021 of the concave portion 5020 of the guide member 5. Therefore, the velocity at which the cap 22B swings in an orientation in which the tip 224 of the cap 22B approaches the outer wall portion 502, and the velocity at which the cap 22B falls into the concave portion 5020 are reduced compared to the conventional case, making it possible to suppress generation of a tapping sound.

The invention claimed is:

1. A toothed cable guiding apparatus comprising:
a guide member having a curved guiding path; and
a toothed cable guided by the guide member;
wherein the guide member comprises an inner wall portion and an outer wall portion,
wherein the toothed cable moves and is guided between the inner wall portion and the outer wall portion of the guide member by a driving force of a drive source and transmits the driving force to an operation target,
wherein the inner wall portion and the outer wall portion constitute the curved guiding path having a curvature to guide the toothed cable,
wherein the inner wall portion is provided on an inner side of the curvature in a radial direction of the curvature and the outer wall portion is provided on the outer side of the curvature in the radial direction of the curvature, the guide member having a concave portion on an inner surface of the outer wall portion, which inner surface opposes the toothed cable,
wherein a distance between a bottom surface of the concave portion and the inner wall portion is greater than a distance between a portion of the outer wall portion other than the concave portion and the inner wall portion,
wherein the toothed cable comprises a cable body, and a cap provided at a tip of the cable body,
wherein the cap is positioned in the guide member closer to one end of the guide member than the cable body in an axial direction of the guide member,
wherein the toothed cable is configured to be movable in the curved guiding path of the guide member in a direction from one end side toward the other end side of the guide member in the axial direction,
wherein the cap comprises a tip portion, and a body portion provided on a side of a base end of the tip portion in the cap,
wherein the tip portion of the cap has a conical or truncated cone shape, or, a conical or truncated cone shape of which a tip is chamfered, or, a conical or truncated cone shape of which boundary portion between the tip portion and the body portion is chamfered, and
wherein the body portion has a cylindrical shape, or, a cylindrical shape of which boundary portion between the cap is chamfered,
the toothed cable is configured such that the cap moves so as to be in sliding contact with the outer wall portion and an edge of the concave portion when the toothed cable moves in a direction from one end side of the guide member toward the other end side of the guide member in the curved guiding path of the guide member, and
the toothed cable is configured such that an end region of the cable body, which end region is on the side of the cap, contacts the inner wall portion of the guide member when the cap comes into sliding contact with an edge of the concave portion to limit an angle at which the cap swings in an orientation in which a tip of the tip portion of the cap approaches the outer wall portion.

2. The toothed cable guiding apparatus according to claim 1, wherein the body portion of the cap has a length such that the end region of the cable body on the side of the cap contacts the inner wall portion of the guide member when the tip portion of the cap comes into sliding contact with the edge of the concave portion.

3. The toothed cable guiding apparatus according to claim 1, wherein the body portion of the cap comprises a cylindrical portion of the cylindrical shape and extends along a longitudinal direction of the cap and a ring-shaped portion being provided along a circumferential direction on an outer peripheral surface of the cylindrical portion and projecting outwardly in a diameter direction of the cylindrical portion.

4. A toothed cable guiding apparatus comprising:
a guide member having a curved guiding path; and
a toothed cable guided by the guide member,
wherein the guide member comprises an inner wall portion and an outer wall portion,
wherein the toothed cable moves and is guided between the inner wall portion and the outer wall portion of the guide member by a driving force of a drive source and transmits the driving force to an operation target,
wherein the inner wall portion and the outer wall portion constitute the curved guiding path having a curvature to guide the toothed cable,
wherein the inner wall portion is provided on an inner side of the curvature in a radial direction of the curvature and the outer wall portion is provided on the outer side of the curvature in the radial direction of the curvature, the guide member having a concave portion on an inner surface of the outer wall portion, which inner surface opposes the toothed cable,
wherein a distance between a bottom surface of the concave portion and the inner wall portion is greater than a distance between a portion of the outer wall portion other than the concave portion and the inner wall portion,
wherein the toothed cable comprises a cable body, and a cap provided at a tip of the cable body,
wherein the cap is positioned in the guide member closer to one end of the guide member than the cable body in an axial direction of the guide member,
wherein the toothed cable is configured to be movable in the curved guiding path of the guide member in a direction from one end side toward the other end side of the guide member in the axial direction,
wherein the cap comprises a tip portion, and a body portion to be provided on a side of a base end of the tip portion in the cap,
the toothed cable is configured such that the cap moves so as to be in sliding contact with the outer wall portion and an edge of the concave portion when the toothed cable moves in a direction from one end side of the guide member toward the other end side of the guide member in the curved guiding path of the guide member,
wherein the tip portion of the cap has a tapered shape, an outer peripheral surface of the tip portion of the cap has a curved shape bulging outwardly in a diameter direction of the tip portion, and the body portion has a cylindrical shape, and
wherein the toothed cable is configured such that the tip portion of the cap comes into sliding contact with an edge of the concave portion to suppress velocity at which the cap swings in an orientation in which a tip of the tip portion of the cap approaches the outer wall portion.

* * * * *